(12) United States Patent
Lee

(10) Patent No.: US 6,469,768 B1
(45) Date of Patent: Oct. 22, 2002

(54) BISTABLE TWISTED NEMATIC MODE REFLECTIVE LIQUID CRYSTAL DISPLAY

(75) Inventor: Sin-Doo Lee, Seoul (KR)

(73) Assignee: Samsung Display Devices Co., Ltd., Suwon-si (KR)

( * ) Notice: Subject to any disclaimer, the term of this patent is extended or adjusted under 35 U.S.C. 154(b) by 0 days.

(21) Appl. No.: 09/292,277

(22) Filed: Apr. 15, 1999

(30) Foreign Application Priority Data

Apr. 18, 1998 (KR) ......................................... 1998-13944

(51) Int. Cl.[7] ......................... C09K 19/02; G02F 1/1335
(52) U.S. Cl. ......................... 349/177; 349/117; 349/121
(58) Field of Search ............................... 349/177, 117, 349/100, 121

(56) References Cited

U.S. PATENT DOCUMENTS

| | | | | |
|---|---|---|---|---|
| 3,876,287 A | * | 4/1975 | Spokel | 350/160 |
| 4,799,776 A | * | 1/1989 | Yamazaki et al. | 350/350 |
| 5,313,321 A | * | 5/1994 | Yamamoto et al. | 359/72 |
| 5,493,431 A | * | 2/1996 | Baba et al. | 359/73 |
| 6,061,111 A | * | 5/2000 | Kataoka et al. | 349/113 |
| 6,295,109 B1 | * | 9/2001 | Kubo et al. | 349/119 |
| 6,300,990 B1 | * | 10/2001 | Yamaguchi et al. | 349/112 |
| 6,320,571 B1 | * | 11/2001 | Takahashi et al. | 345/204 |
| 6,335,775 B1 | * | 1/2002 | Iwamura et al. | 349/125 |

OTHER PUBLICATIONS

Kim et al, "P–34: Temperature Dependence of Bistable Electro–Optic Charateristices of Twisted Nematic Liquid Crystals", Europe Display '96, pp. 337–340.*

Kuo et al, "P–45: Reflective Display Using Mixed–Mode Twisted–Nematic Cells with wide viewing angle and high contrast", EuroDisplay '96, pp. 387–390.*

Wu, et al., "Applied Physics Letter 68", p. 1455 (1996).

(List continued on next page.)

Primary Examiner—Toan Ton
Assistant Examiner—Mike Qi
(74) Attorney, Agent, or Firm—Christie, Parker & Hale, LLP

(57) ABSTRACT

A liquid crystal display includes front and rear insulating substrates, each having inner and outer surfaces. The inner surface of the rear substrate faces the inner surface of the front substrate. A transparent electrode is formed on the inner surface of the front substrate, and a mirror electrode made with a reflective material is formed on the inner surface of the rear substrate. A polarizer is attached on the outer surface of the front substrate, and homogeneously aligning films are coated on the transparent and the mirror electrodes, followed by rubbing unidirectionally. A liquid crystal layer is interposed between the homogeneously aligning films on the two substrates. The liquid crystal layer is composed of a nematic liquid crystal material which has positive dielectric anisotropy and a chiral dopant to have a twisted structure. The molecular director in the liquid crystal layer is initially in the $\pi$-twisted state. When a high reset voltage is applied to the liquid crystal display, the molecular director is rearranged in a homeotropically deformed state. A selection voltage lower than the reset voltage is applied to obtain one of the zero-twisted state and the $\pi$-twisted state. Thereafter, a data voltage is applied for enhancing electro-optic characteristics.

3 Claims, 8 Drawing Sheets

OTHER PUBLICATIONS

Kuo, et al., "Proceedings of EuroDisplay 96", p. 387 (1996).

Uchida et al., "Asia Display 95", p. 599 (1995).

Wu, et al., "Mixed–Mode Twisted Nematic Liquid Crystal Cells for Reflective Display", Applied Physics Letter 68 (11), Mar. 1996, pp. 1455–1457.

Kuo, et al., "P–45: Reflective Displays Using Mixed–Mode Twisted–Nematic Cells with wide Viewing Angle and High Contrast", EuroDisplay '96, pp. 387–390.

Uchida et al., "S–24–1 Invited A Novel reflective LCD for High Resolution Color Display", Asia Display '95, pp. 599–602.

D.W. Berreman et al., "New Bistable Liquid–Crystal Twist Cell", J. Appl. Phys. 52(4), Apr. 1981, pp. 3032–3039(*).

T. Tanaka, et al., "S10–3 A Bistable Twisted Nematic (BTN) LCD Driven by a Passive–Matrix Addressing", Asia Display '95, pp. 259–262 (*).

H.S. Kwok, "Parameter Space Representation of Liquid Crystal display Operating Modes", J. Appli. Phys. 80(7), Oct. 1, 1996, pp. 3687–3693 (*).

Kim et al., "P–34: Temperature Dependence of Bistable Electro–Optic Characteristics of Twisted Nematic Liquid Crystals", Europe Display '96, pp. 337–340 (*).

R.B. Meyer et al., "Discovery of dc Switching of a Bistable Boundary Layer Liquid Crystal Display", App. Phys. Lett. 43 (4), Aug. 1983, pp. 342–344 (*).

* cited by examiner

BISTABLE TWISTED NEMATIC MODE REFLECTIVE LIQUID CRYSTAL DISPLAY

BACKGROUND OF THE INVENTION (a) Field of the Invention

The present invention relates to a reflective type liquid crystal display, in particular, to a bistable twisted-nematic mode reflective liquid crystal display.

(b) Description of the Related Art

Reflective type liquid crystal displays (LCDs) have been attracting users recently, especially in the area of low power consumption applications such as portable information communication devices. A conventional reflective type LCD includes a liquid crystal cell that has two facing substrates with field generating electrodes and a liquid crystal layer therebetween. The reflective type LCD usually includes two polarizers attached to the outer surfaces of the liquid crystal cell and a reflector behind the liquid crystal cell.

However, typical reflective type LCDs suffer from low brightness and parallax. Such problems become more severe in color displays with color filters for individual pixels.

One of the solutions is to use a mirror electrode just behind the liquid crystal layer and a single polarizer. [See S.-T. Wu and C.-S. Wu, *Applied Physics Letter* 68, 1455 (1996), C.-L. Kuo and C.-K. Wei, *Proceedings of EuroDisplay* 96, 387 (1996). and T. Uchida et al., *Asia Display* 95, p. 599 (1995).]

However, the conventional reflective type LCD with a single polarizer has a problem of low contrast.

SUMMARY OF THE INVENTION

It is therefore an object of an embodiment of the present invention to increase the contrast ratio of a reflective type LCD with a single polarizer.

These and other objects are provided, according to an embodiment of the present invention, by using a bistable twisted nematic mode.

In detail, a liquid crystal display according to an embodiment of the present invention includes front and rear insulating substrates, each having an inner surface and an outer surface. The inner surfaces of the two substrates face each other. A transparent electrode is formed on the inner surface of the front substrate, and a mirror electrode made with a reflective material is formed on the inner surface of the rear substrate. A polarizer is attached on the outer surface of the front substrate, and homogeneously aligning films are prepared on both the transparent and the reflective electrodes. A bistable liquid crystal layer is interposed between the two substrates with the aligning films. The liquid crystal layer includes a nematic liquid crystal material having positive dielectric anisotropy and a chiral dopant so as to produce a twisted structure. The molecular director in the liquid crystal layer is driven in such a way that it has two stable states.

The two stable states may correspond to the twist angle of $\Phi \pm \pi$, respectively, where $\Phi$ is an initial twist angle of the molecular director. The first stable state, $\Phi - \pi$, is less twisted and the second stable state, $\Phi + \pi$, is more twisted than the initial twisted state.

The thickness (d) of the liquid crystal layer, the natural pitch (p) of the liquid crystal, and the initial twist angle ($\Phi$) of the molecular director preferably satisfy the relationship of $1.2(\Phi/2\pi) \leq d/p\_ \leq 1.4(\Phi/2\pi)$. In this case, it is preferable that the initial twist angle of the molecular director is substantially equal to $\pi$.

The homogeneously aligning films are preferably rubbed in two different directions The rubbing direction on one of the films is antiparallel to that on the other. It is desirable that the optic axis of the polarizer makes 45 degrees with respect to the two rubbing directions. If the optical retardation through the liquid crystal layer in the first stable state is equal to a quarter wavelength of the incident light, the light reflected from the mirror is blocked by the polarizer while it is transmitted through the polarizer in the second stable state which is optically isotropic.

According to an embodiment of the present invention, the LCD further includes a retardation film interposed between the front substrate and the polarizer. In one embodiment of the present invention, the optic axis of the retardation film of a quarter wavelength of the incident light is preferably perpendicular to the two rubbing directions. Such retardation film converts a linearly polarized light into a circularly polarized one. In this case, if the optical retardation through the liquid crystal layer in the first stable state is equal to a quarter wavelength of the incident light, the light reflected from the mirror becomes transmitted through the polarizer since the optical retardation is exactly compensated by the retardation film. On the other hand, in the second stable state, the reflected light is blocked since its polarization is perpendicular to the optic axis of the polarizer through total retardation of a half wavelength. In another embodiment of the present invention, the optic axis of the retardation film is parallel to the two rubbing directions.

According to an embodiment of the present invention, the first and the second stable states which undergo bistable switching are obtained by sequentially applying a reset voltage and a selection voltage, which is lower than the reset voltage, to the LCD cell. The rest voltage makes the molecular director to be oriented homeotropically from an initial, homogeneously twisted structure, and the selection voltage makes the molecular director to be stable in one of the first and the second states. A data voltage, lower than the selection voltage, that follows subsequently the reset and the selection voltages may be applied across the transparent electrode and the mirror electrode.

DETAILED DESCRIPTION OF THE PREFERRED EMBODIMENTS

Figure 1:
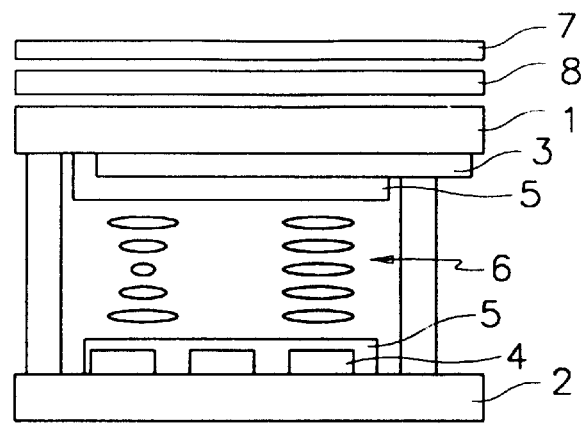
FIG. 1 is a sectional view of a bistable twisted nematic (BTN) mode liquid crystal display (LCD) according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will as be thorough and complete, and will fully convey the scope of the invention to those skilled in the art. In the drawings, the thickness of layers and regions are exaggerated for clarity. Throughout the drawings, the elements are consistently designated by same numbers. It will be understood that when an element such as a layer, a region or a substrate is referred to as being "on" another element, it can be directly on the other element or intervening elements may also be present. In contrast, when an element is referred to as being "directly on" another element, there are no intervening elements present.

FIG. 1 shows a bistable twisted nematic (BTN) mode liquid crystal display (LCD) according to an embodiment of the present invention.

As shown in FIG. 1, a reflective LCD has a pair of insulating substrates 1 and 2 which face each other and made with a transparent material such as glass. A plurality of field generating electrodes 3, made with a transparent conductive material such as indium-tin-oxide (ITO), are formed on the inner surface of the front substrate 1, and a plurality of other field generating electrodes 4, made with a metal such as Al having high reflectance, are formed on the inner surface of the rear substrate 2. The electrodes 3 or 4 on each substrate 1 or 2 extend along a certain direction and they are parallel to each other. However, the electrodes 3 on the front substrate 1 are perpendicular to the electrodes 4 on the rear substrate 2. A pair of homogeneously aligning films 5 made with a material such as polyimide are formed on the respective electrodes 3 and 4. A liquid crystal layer 6 containing a nematic liquid crystal mixed with a chiral dopant and having positive dielectric anisotropy is interposed between the aligning films 5. The aligning films 5 are rubbed in certain directions such that the liquid crystal molecules align along the rubbing direction and have a finite pretilt angle, An optical retardation film 8 for compensating the phase shift experienced through the liquid crystal layer 6 is attached on the outer surface of the front substrate 1, and a polarizer 7 is attached thereon. The optical retardation film 8 may be omitted.

Now, the arrangement of the liquid crystal molecules in the liquid crystal layer 6 is described with reference to FIGS. 2 and 3

Figure 2:
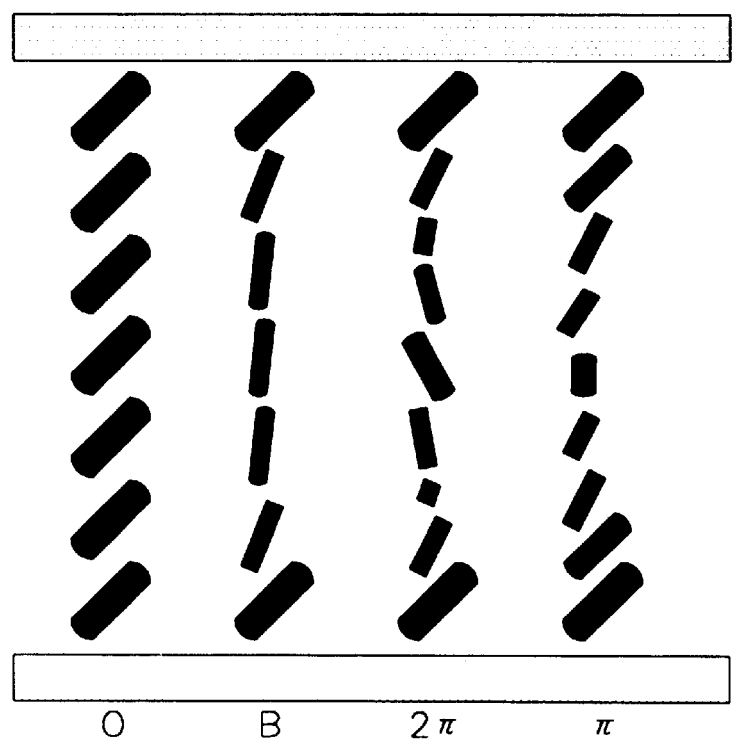
FIG. 2 is a schematic diagram of liquid crystal molecules illustrating the principle of the BTN mode according to the embodiment of the present invention.

The initial twist of the liquid crystal molecules is represented as $\pi$ in FIG. 2, and the molecular director is in the $\pi$-twisted state in which the molecular director rotates 180 degrees on going from one of the aligning films 5 to the other. However. the molecular director may have an arbitrary twist angle.

The $\pi$-twisted state can be obtained using the aligning films 5 whose rubbing directions are antiparallel to each other. When the rubbing directions of the aligning films 5 on the facing substrates 1 and 2 are antiparallel, there exist two possible states, the zero-twisted and the $\pi$-twisted states, of the molecular director in the liquid crystal layer 6. The initial twist of the molecular director is determined by the difference between the magnitude of the twisting force and that of the surface anchoring force. That is, the liquid crystal is in the zero-twisted state when the surface anchoring force is larger than the twisting force while it is in the $\pi$-twisted state when the twisting force is larger than the surface anchoring force.

In order to obtain the $\pi$-twisted state, the ratio of the cell gap d, which is the thickness of the liquid crystal layer 6, to the pitch p of the liquid crystal, d/p, is preferably in the range between 0.6 and 0.7. In the case of the initial $\Phi$-twisted state, the ratio d/p lies preferably in the range of $1.2(\Phi/2\pi)$ and $1.4(\Phi 2\pi)$. In general, when the pretilt angle is a few degrees (about 5 degrees) and the surface anchoring energy is of the order of $1\times 10^{-4}$ J/m$^2$, the liquid crystal is in the $\pi$-twisted state. For realizing the BTN mode, an appreciable pretilt angle is required, which can be achieved by the rubbing process.

The molecular director in the initially $\pi$-twisted state is transformed into a homeotropically oriented state represented by B in FIG. 2 when a voltage, high enough for complete reorientation of the molecules, is applied to the liquid crystal layer 6. It is because the liquid crystal has positive dielectric anisotropy and thus the liquid crystal molecules tend to align in the field direction. As an example of using such high voltage, a reset voltage Vr is shown in FIG. 3 The reset voltage Vr above the Fredericks threshold is applied to reorient the liquid crystal molecules perpendicular to the substrates.

In this state, when the applied voltage is removed or reduced, the molecular director changes its deformed, homeotropically oriented state into one of the three possible relaxed states depending on the way of reducing the applied voltage. The possible three states are the $\pi$-twisted state, the zero-twisted state, and the $2\pi$-twisted state. However, only the most probable, $\pi$-twisted state is produced in case that the molecular director has negligible pretilt angle.

For the BTN mode, the last two states are chosen by the reduction rate of the applied voltage. Slow reduction of the applied voltage causes the molecular director to be relaxed into its initial, $\pi$-twisted state while abrupt reduction of the applied voltage yields one of the last two states depending on the magnitude of the reduced voltage. The underlying physical mechanism is attributed to an energy barrier between the initial, $\pi$-twisted state and the zero-twisted or the $2\pi$-twisted state. The energy barrier is associated with the defects such as disclinations that distinguish between the states. However, no energy barrier exists between the deformed, homeotropically oriented state and the zero-twisted state or the $\pi$-twisted state, and thus a continuous transition between them is possible. This is the basic operation principle of The BTN mode that uses the last two relaxed states.

The selection of the last two states is governed by the magnitude of the reduced voltage. The liquid crystal molecules are in the $2\pi$-twisted state when the reduced voltage is less than a certain threshold while in the zero-twisted state when it is larger than the threshold. The reduced voltage behaves as a selection voltage Vs which is usually smaller than the reset voltage Vr in FIG. 3.

Therefore, with the combination of these two voltage signals, Vr and Vs, the initial, $\pi$-twisted state is transformed into the zero-twisted or the $2\pi$-twisted state If the initial state is $\Phi$-twisted state, it is transformed into one of the two $(\Phi\pm\pi)$ twisted states according to the magnitude of the selection voltage.

For example, in the case of the reset voltage of 40 V, the liquid crystal molecules are in the zero-twisted state for the selection voltage of 0 V while they are in the $2\pi$-twisted state for the selection voltage of 5 V.

Together with the above principle, a data voltage signal Vd, shown in FIG. 3, which follows subsequently the reset and selection signals, is important for practical applications. In the multiplexed driving scheme, especially for the passive matrix type BTN LCD, the data signal is needed for enhancing electro-optic characteristics. One requirement is that the magnitude of the data voltage is smaller than that of the selection voltage. If the data voltage is very high, a transition from one of the bistable states to the other may occur. When the data voltage is properly designed for the driving scheme, the electro-optic characteristics of the reflective BTN LCD are significantly enhanced. Moreover, the data signal of an arbitrary waveform can be implemented into active matrix LCDs using active switching elements such as thin film transistors.

Figure 4A:
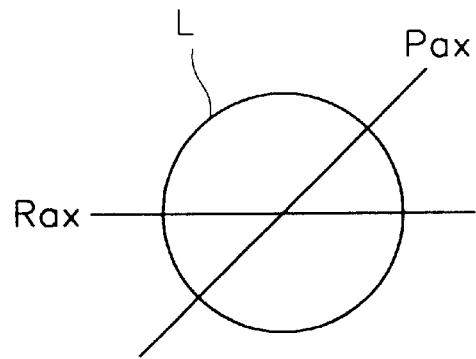
FIGS. 4A to 6B illustrate various optical configurations of the the BTN LCD according to the embodiment of the present invention.
Figure 5A:
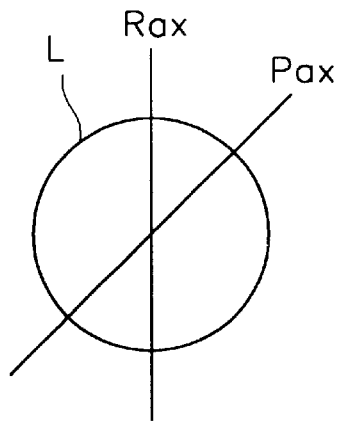
Figure 5B:
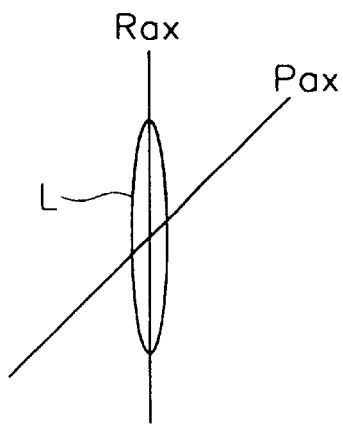
Figure 6A:
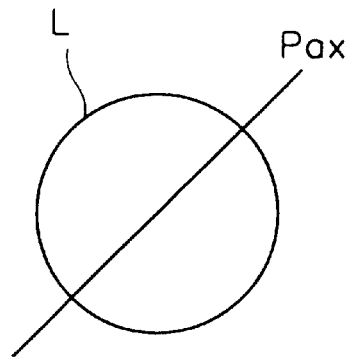
Figure 6B:
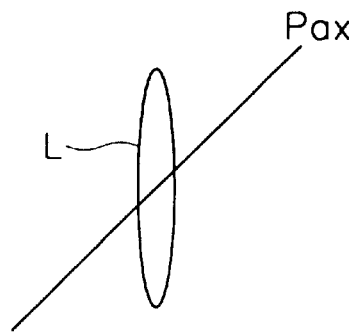
Figure 7:
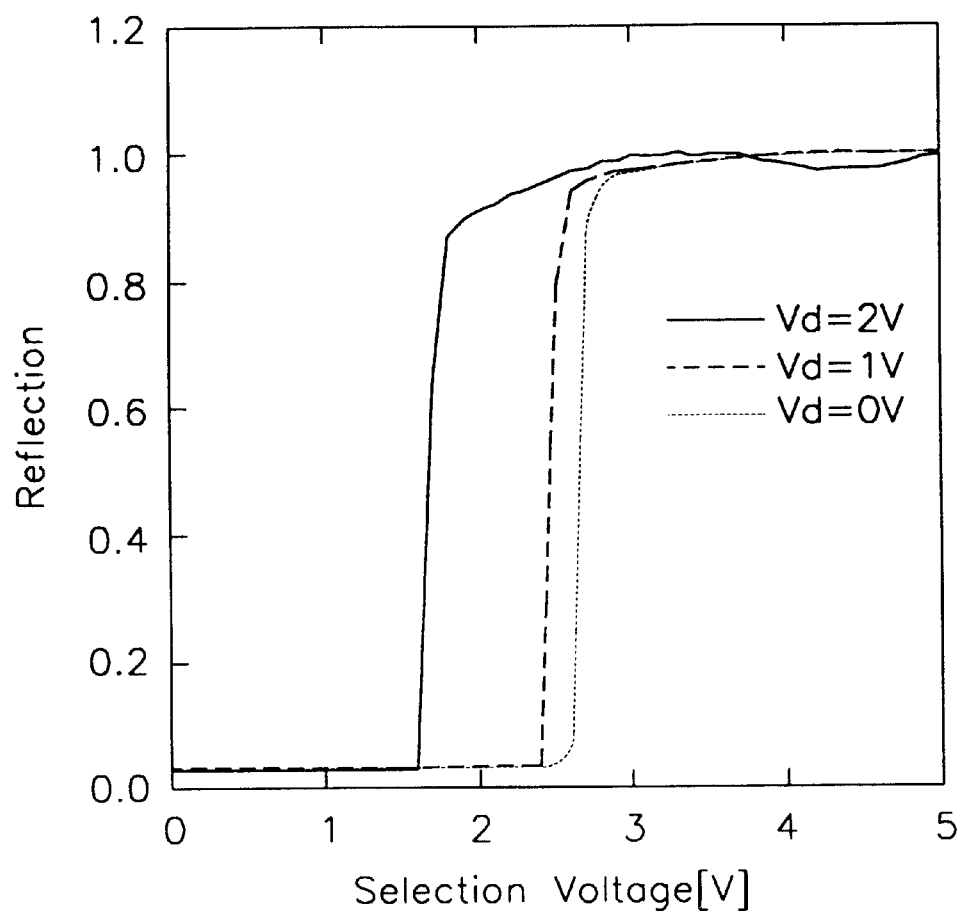
FIGS. 7 to 9 are graphs showing the reflection of the BTN LCD as function of the selection voltage for the data voltages of 0, 1 and 2 V according to the embodiment of the present invention.

Next, the optical properties of the reflective BTN LCD are described with reference to FIGS. 4A to 6B in which the rubbing direction is denoted by L and the optic axes of the optical retardation film 8 and the polarizer by 7 $R_{ax}$ and $P_{ax}$, respectively. FIGS. 4A, 5A and 6A illustrate the $2\pi$-twisted states, and FIGS. 4B, 5B and 6B illustrate the zero-twisted states.

The BTN mode has two main optical features. One of them concerns the effective birefringence resulting from the twist in the zero-twisted or $2\pi$-twisted states, and the other is that the optical activity disappears when the retardation $d\Delta n$, i.e. the cell gap d multiplied by the birefringence $\Delta n$, is smaller than the wavelength of incident light. The second is directly related to the optical properties of the reflective BTN LCD in the the Mauguin regime. In other words, the $2\pi$-twisted state is optically isotropic under such circumstance.

Figure 4B:
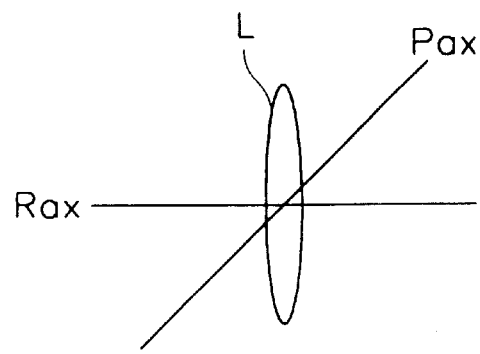

FIGS. 4A and 4B show the optical configuration that the optic axis $P_{ax}$ of the polarizer 7 makes 45 degrees with respect to the rubbing direction L (or the molecular director on the surface of the aligning film 5) on the front substrate 1, and the optic axis $R_{ax}$ of the optical retardation film 8 is perpendicular to the rubbing direction L.

First, a case is considered where the retardation film 8 gives $\lambda/4$ phase shift where $\lambda$ is the wavelength of incident light.

In this configuration, the incident light is linearly polarized after passing through the polarizer 7, and then circularly polarized through the retardation film 8. The circularly polarized light passes subsequently through the liquid crystal layer 6 and arrives at the metal electrodes 4 on the rear substrate 2. If the liquid crystal layer is optically isotropic, the direction of the circular polarization is exactly reversed when reflected from the metal electrodes 4, i.e., the left-handed circular polarization becomes right-handed while the right-handed circular polarization becomes left-handed.

The reflected light passes back through the liquid crystal layer 6 and comes through the retardation film 8. Then, the reflected, circularly polarized light becomes linearly polarized due to the phase shift experienced through the retardation film 8 but the direction of the polarization is perpendicular to the optic axis of the polarizer.

More specifically, the polarization direction of the reflected light resulting from total phase difference through the retardation film 8 and the reflection from the metal electrodes 4 becomes 135 degrees with respect to the rubbing directions, and thus it is perpendicular to the incident linear polarization As described above, if the value of the cell gap d multiplied by the birefringence $\Delta n$ is smaller than the wavelength of the incident light, the $2\pi$-twisted state becomes optically isotropic. Accordingly, the resultant polarization of the $2\pi$-twisted state is perpendicular to the optic axis $P_{ax}$ of the polarizer 7, and the reflected light is blocked by the polarizer 7, thereby giving a dark state.

On the other hand, when the liquid crystal molecules are in the zero-twisted state, the liquid crystal layer has a finite effective birefringence and a bright state can be realized.

As an example, if the optical retardation of the liquid crystal layer 6 is $\lambda/4$, the total retardation through the liquid crystal layer 6 and the retardation film 8 is exactly compensated since the rubbing direction and the optic axis of the retardation film is perpendicular to each other. Accordingly, the resultant polarization is parallel to the polarizer 7, and a bright state is obtained in this case.

Next, it is assumed that the retardation film 8 gives the phase shift of $\lambda/2$ while the liquid crystal layer 6 gives that of $\lambda/4$. Then, compared to the above case, an extra phase difference of $\lambda/4$ is obtained through the two layers 6 and 8 in the zero-twisted state, and thus a dark state is achieved. In the $2\pi$-twisted state, however, a bright state is obtained since the liquid crystal layer is optically isotropic when the retardation $d\Delta n$ is smaller than the wavelength of the incident light.

FIGS. 5A and 5B show the optical configuration that the optic axis of the optical retardation film 8 is parallel to the rubbing direction L. The dark state is obtained in the $2\pi$-twisted state like the previous case. However, the zero-twisted state has somewhat different characteristics. In the first example, since the optic axis of the retardation film 8 is perpendicular to the rubbing direction, the total retardation through the reflective BTN LCD is exactly compensated when the optical retardation through the liquid crystal layer 6 is $\lambda/4$. However, in this example, the optic axes of the retardation film 8 and the rubbing direction coincide with each other, and an extra phase difference of $2\pi$ comes through the reflective BTN LCD. Nevertheless, since the light having the phase difference of $2n\pi$ (n is an integer) has the same optical property, a bright state in the zero-twisted state is obtained.

More quantitatively, the effective birefringence $d\Delta n_{eff}$ is given as follows:

$$d\Delta n_{eff} = \int_0^d dz \frac{n_e n_o}{\sqrt{n_e^2 \sin^2\theta + n_o^2 \cos^2\theta}} - n_o d_1$$

where $n_\theta$ is the extraordinary refractive index, $n_0$ is the ordinary refractive index, and $\theta$ is the tilt angle of the molecular director with respect to the surface of the substrate. In this relation, the effective retardation $d\Delta n_{eff}=d(n_\theta - n_0)$ when the tilt angle is zero, and becomes zero when the tilt angle approaches 90 degrees. The effective birefringence $\Delta n_{eff}$ decreases as the tilt angle increases. The tilt angle depends on the magnitude of the applied voltage and the relevant elastic coefficients of the liquid crystal. In the case of positive dielectric anisotropy $\Delta \in$, the tilt angle of the molecular director increases and thus the effective birefringence decreases as the applied voltage increases.

In a more realistic case, the effect of a data voltage on the effective birefringence should be taken into account when a data voltage signal is present in the driving scheme of the reflective BTN LCD. When the wavelength $\lambda$ of the incident light is 550 nm which is the central wavelength in the visible light, $\lambda/4$ is about 140 nm. In order to obtain the same optical retardation as 140 nm through the liquid crystal layer, the birefringence $\Delta n \approx 0.07$ for the LCD cell of 2 $\mu$m thick. In the presence of the data voltage signal, however, the birefringence should be somewhat larger than 0.07.

The wavelength dispersion of birefringence $\Delta n$ is also considered.

Since the data voltage is designed smaller than the Fredericks threshold in the $2\pi$-twisted state, the dark state is quite insensitive to the data voltage. However, the bright state depends on the data voltage. When the optic axis of the retardation film 8 is parallel to the rubbing direction, the electro-optic characteristics exhibit strong dependence on the data voltage. In this case, due to the dispersion of the birefringence Δn of the liquid crystal as well as the retardation film 8, the extra phase difference of 2π makes both the bright and dark states to be sensitive to the molecular director reorientation. In contrast, when the optic axis of the retardation film 8 is perpendicular to the rubbing direction, the dispersion effect is diminished since the phase difference through the reflective BTN LCD is compensated. This means that the bright and the dark states are almost insensitive to the magnitude of the data voltage signal.

As described above, the optical retardation film 8 may be omitted. In the absence of the retardation film, if the phase shift through the liquid crystal layer 6 is λ/4, the phase difference between the incident light and the outgoing light in the zero-twisted state is λ/2 so that a dark state is obtained. The liquid crystal layer 6 in the 2π-twisted state is optically isotropic, and thus a bright state is obtained.

Experiment

The BTN cell was made using ITO and metal coated glass substrates. The aligning films of polyimide from SE-3140 (Nissan Chemical Co.) were prepared on the ITO and the metal electrodes to promote planar alignment. The aligning films on both substrates were unidirectionally rubbed. The cell was assembled such that the rubbing axes are antiparallel to each other to produce a stable geometry for the zero-twisted and the 2π-twisted states. The cell gap was maintained using glass spacers with the thickness of 2 μm. A chiral dopant was introduced into a nematic liquid crystal, and the doping concentration was adjusted to give d/p=0.62. The liquid crystal and the chiral dopant used were ZLI-3700-100 (Δn=0.098, ΔЄ=5.4) and S-811 of E. Merck, respectively. A polarizer was oriented to be 45 degrees with respect to the rubbing direction. An optically uniaxial film with the phase retardation of 140 nm was used, and its optic axis was oriented to be zero degree or 90 degrees with respect to the rubbing direction.

Figure 3:
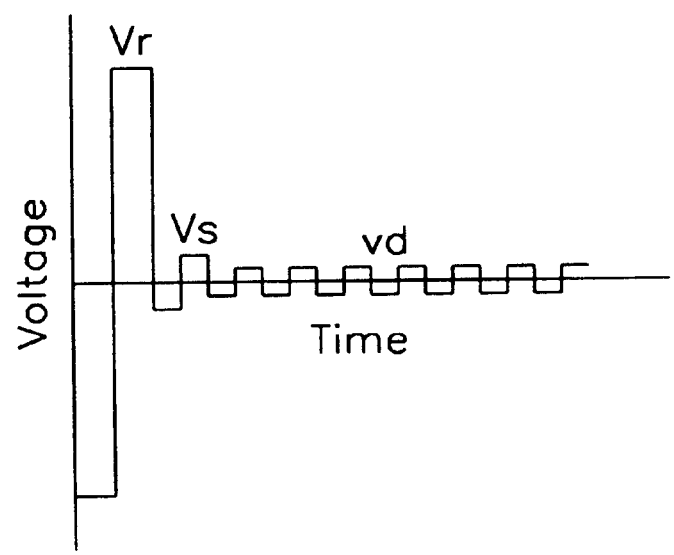
FIG. 3 shows the waveforms of the signals for driving the BTN mode LCD according to the embodiment of the present invention.

The BTN cell was driven using a voltage waveform shown in FIG. 3. The width of the reset pulse was 2 msec, and those of the selection and the data pulses were 1 msec. The magnitude of the reset pulse was fixed to be 40 V, and the frame frequency of the voltage waveform was 50 Hz. A He—Ne laser of 543.5 nm was used as a light source, and the reflected light intensity from the mirror electrode in the BTN cell was measured as a function of the voltage.

Figure 8:
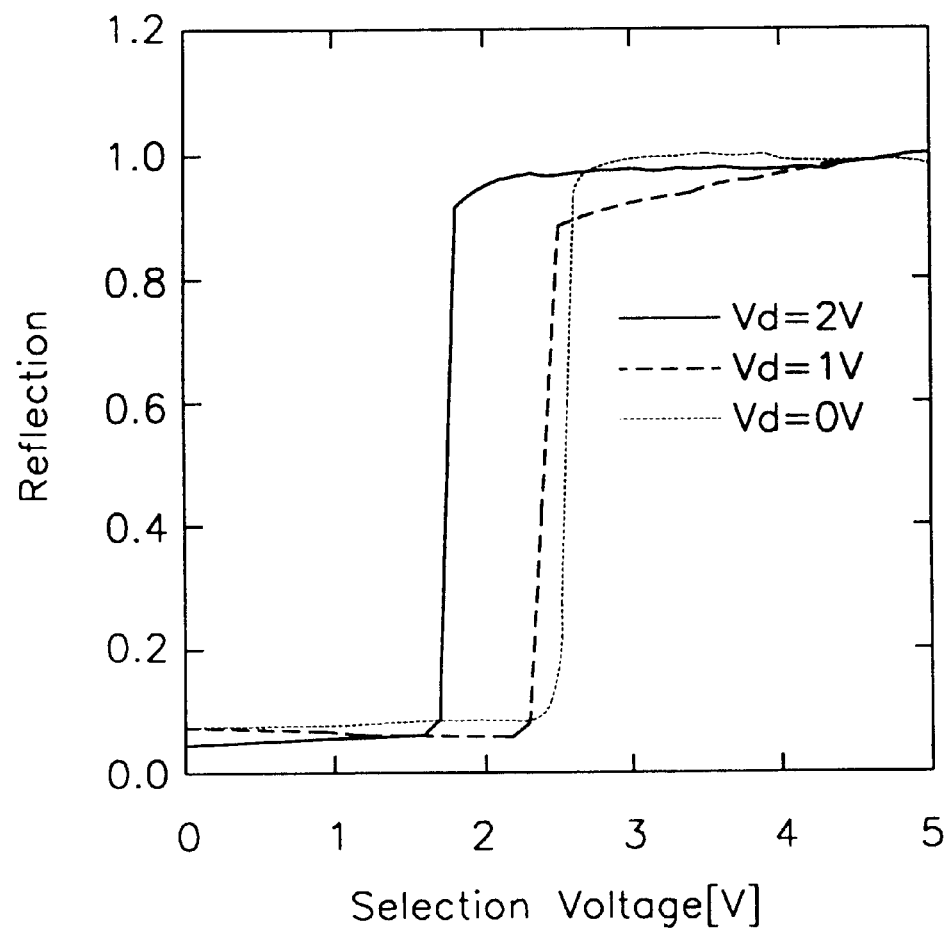
Figure 9:
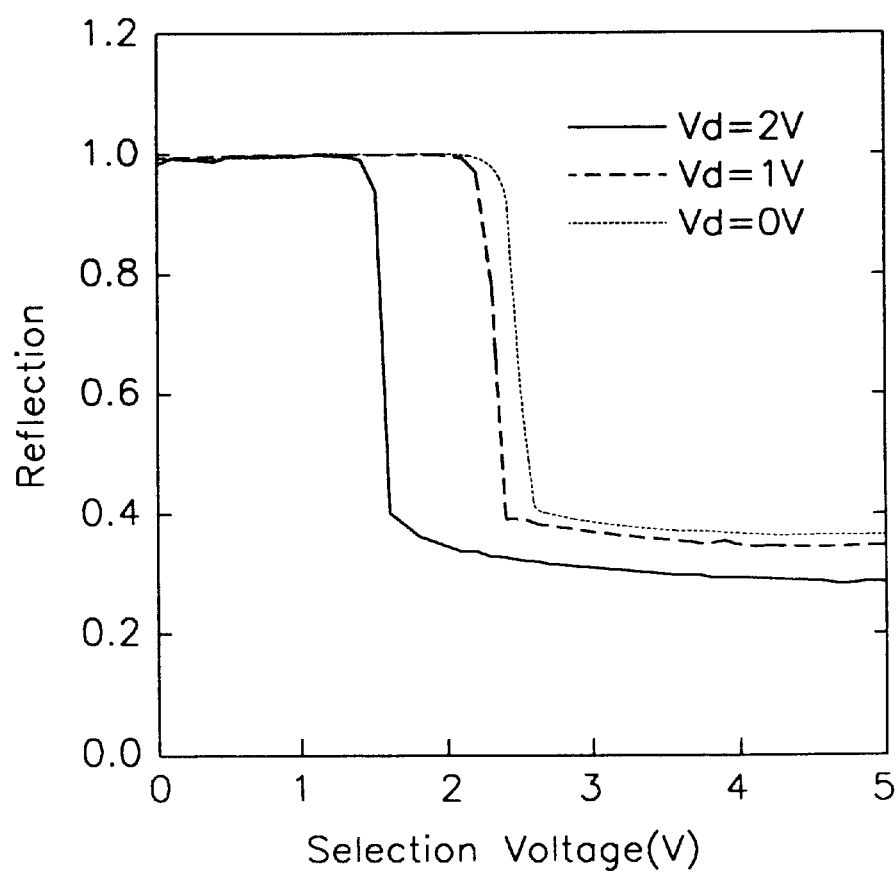

The reflective intensities are shown in FIGS. 8 and 9 as a function of the selection voltage. The optic axis of the retardation film is perpendicular (FIG. 8) or parallel (FIG. 9) to the rubbing direction of the BTN cell. The data voltage was varied from 0 V to 2 V. The zero-twisted and the 2π-twisted states were achieved at high and low selection voltages, respectively. The value of dΔn of the BTN cell is quite smaller than the wavelength of the incident light so that the 2π-twisted state becomes optically isotropic. With a retardation film which corresponds to a quarter wavelength of the incident light, the total phase difference experienced through the film upon reflecting from the mirror becomes a half wavelength, and thus the dark state is readily obtained under a single polarizer.

This means that the bright and the dark states are achieved in the zero-twisted and the 2π-twisted states, respectively.

In the drawings and specification, there have been disclosed typical preferred embodiments of the present invention and, although specific terms are employed, they are used in a generic and descriptive sense only and not for purposes of limitation, the scope of the invention being set forth in the following claims.

What is claimed is:

1. A liquid crystal display comprising:

a front insulating substrate having inner and outer surfaces;

a rear insulating substrate having inner and outer surfaces, the inner surface of the rear substrate facing the inner surface of the front substrate;

a transparent electrode disposed on the inner surface of the front substrate;

a mirror electrode comprising a reflective material, said mirror electrode being disposed on the inner surface of the rear substrate;

a polarizer disposed on the outer surface of the front substrate;

a homogeneous aligning film disposed on each of the transparent electrode and the mirror electrodes; and a bistable liquid crystal layer interposed between the aligning films on the front and the rear substrates and comprising a nematic liquid crystal material having positive dielectric anisotropy and a chiral dopant, said nematic liquid crystal material having a twisted structure, wherein a molecular director of the liquid crystal layer is driven in such a way that the molecular director has two stable states, wherein the thickness (d) of the liquid crystal layer, the pitch (p) of the liquid crystal layer and the initial twist angle Φ of the molecular Φ director satisfy the relationship of $1.2(\Phi/2\pi) \leq d/p \leq 1.4(\Phi/2\pi)$, wherein the initial twist angle of the molecular director is substantially equal to π, wherein homogeneously aligning films are rubbed in two different directions, and the two rubbing directions are antiparallel to each other, wherein an optic axis of the polarizer makes substantially 45 degrees with respect to the two rubbing directions, and wherein a retardation of the liquid crystal layer is substantially equal to a quarter wavelength of incident light in one of the two stable states, and the liquid crystal layer in the other stable state is optically isotropic.

2. A liquid crystal display comprising:

a front insulating substrate having inner and outer surfaces;

a rear insulating substrate having inner and outer surfaces, the inner surface of the rear substrate facing the inner surface of the front substrate;

a transparent electrode disposed on the inner surface of the front substrate;

a mirror electrode comprising a reflective material, said mirror electrode being disposed on the inner surface of the rear substrate;

a polarizer disposed on the outer surface of the front substrate;

a retardation film interposed between the front substrate and the polarizer;

a homogeneous aligning film disposed on each of the transparent electrode and the mirror electrodes; and a bistable liquid crystal layer interposed between the aligning films on the front and the rear substrates and comprising a nematic liquid crystal material having positive dielectric anisotropy and a chiral dopant, said nematic liquid crystal material having a twisted structure, wherein a molecular director of the liquid crystal layer is driven in such a way that the molecular director has two stable states, wherein the thickness (d) of the liquid crystal layer, the pitch (p) of the liquid crystal layer and the initial twist angle $\Phi$ of the molecular $\Phi$ director satisfy the relationship of $1.2(\Phi/2\pi) \leq d/p \leq 1.4(\Phi/2\pi)$, wherein the initial twist angle of the molecular director is substantially equal to $\pi$, wherein homogeneously aligning films are rubbed in two different directions, and the two rubbing directions are antiparallel to each other, wherein an optic axis of the polarizer makes substantially 45 degrees with respect to the two rubbing directions, wherein an optic axis of the retardation film is substantially perpendicular to the two rubbing directions, and wherein the total retardation of the liquid crystal layer and the retardation film is substantially equal to a quarter wavelength of incident light in one of the two stable states, and the liquid crystal layer in the other stable state is optically isotropic.

3. A liquid crystal display comprising:

a front insulating substrate having inner and outer surfaces;

a rear insulating substrate having inner and outer surfaces, the inner surface of the rear substrate facing the inner surface of the front substrate;

a transparent electrode disposed on the inner surface of the front substrate;

a mirror electrode comprising a reflective material, said mirror electrode being disposed on the inner surface of the rear substrate;

a polarizer disposed on the outer surface of the front substrate;

a retardation film interposed between the front substrate and the polarizer;

a homogeneous aligning film disposed on each of the transparent electrode and the mirror electrodes; and a bistable liquid crystal layer interposed between the aligning films on the front and the rear substrates and comprising a nematic liquid crystal material having positive dielectric anisotropy and a chiral dopant, said nematic liquid crystal material having a twisted structure, wherein a molecular director of the liquid crystal layer is driven in such a way that the molecular director has two stable states, wherein the thickness (d) of the liquid crystal layer, the pitch (p) of the liquid crystal layer and the initial twist angle $\Phi$ of the molecular $\Phi$ director satisfy the relationship of $1.2(\Phi/2\pi) \leq d/p \leq 1.4(\Phi/2\pi)$, wherein the initial twist angle of the molecular director is substantially equal to $\pi$, wherein homogeneously aligning films are rubbed in two different directions, and the two rubbing directions are antiparallel to each other, wherein an optic axis of the polarizer makes substantially 45 degrees with respect to the two rubbing directions, wherein an optic axis of the retardation film is substantially parallel to the two rubbing directions, and wherein the total retardation of the liquid crystal layer and the retardation film is substantially equal to a quarter of wavelength of incident light in one of the two stable states, and the liquid crystal layer in the other stable state is optically isotropic.

* * * * *